US010694050B1

United States Patent
Black et al.

(10) Patent No.: US 10,694,050 B1
(45) Date of Patent: Jun. 23, 2020

(54) CUSTOM RECOMMENDATION APPLICATION FOR CREATING PHOTO BOOK COVER

(71) Applicant: PlanetArt, LLC, Calabasas, CA (US)

(72) Inventors: Adam Black, Newbury Park, CA (US); Erik Malkemus, Los Angeles, CA (US); Roger Bloxberg, Calabasas, CA (US); Zhang Ming Jun, Shanghai (CN); Fan Xiang, Shanghai (CN); Wang Ping, Shanghai (CN)

(73) Assignee: PLANET ART, LLC, Calabasas, CA (US)

( * ) Notice: Subject to any disclaimer, the term of this patent is extended or adjusted under 35 U.S.C. 154(b) by 0 days.

(21) Appl. No.: 16/712,216

(22) Filed: Dec. 12, 2019

Related U.S. Application Data

(63) Continuation of application No. 16/268,982, filed on Feb. 6, 2019, now Pat. No. 10,511,726.

(51) Int. Cl.
| | |
|---|---|
| *G06K 9/00* | (2006.01) |
| *H04N 1/00* | (2006.01) |
| *G06K 9/34* | (2006.01) |

(52) U.S. Cl.
CPC ..... *H04N 1/00196* (2013.01); *G06K 9/00228* (2013.01); *G06K 9/34* (2013.01); *H04N 1/00169* (2013.01)

(58) Field of Classification Search
None
See application file for complete search history.

(56) References Cited

U.S. PATENT DOCUMENTS

| | | | | |
|---|---|---|---|---|
| 8,577,166 B1* | 11/2013 | Ferguson | ............... | G06F 16/958 382/255 |
| 2005/0125726 A1* | 6/2005 | Harper | ................... | B42C 19/02 347/5 |
| 2005/0219384 A1* | 10/2005 | Herberger | ............. | G06T 1/0007 348/239 |
| 2006/0171004 A1* | 8/2006 | Hori | ..................... | H04N 1/3875 358/540 |
| 2008/0089612 A1* | 4/2008 | Isomura | .................. | G06T 11/60 382/295 |
| 2008/0229246 A1* | 9/2008 | Squilla | ................ | G06F 19/3481 715/835 |
| 2009/0115855 A1* | 5/2009 | Gotoh | ................ | H04N 1/00132 348/207.11 |
| 2010/0080490 A1* | 4/2010 | Akiyama | ............. | G06K 9/3216 382/294 |
| 2010/0223565 A1* | 9/2010 | Birdal | ................. | G06F 9/45512 715/764 |
| 2014/0029022 A1* | 1/2014 | Johnson | .................. | G06T 11/60 358/1.2 |
| 2016/0036739 A1* | 2/2016 | Glass | .................... | G06Q 30/06 709/206 |

(Continued)

*Primary Examiner* — David H Chu
(74) *Attorney, Agent, or Firm* — Culhane Meadows PLLC; Robert Klinger

(57) ABSTRACT

A device and algorithm for allowing a customer to choose a photo book cover template that is compatible with a photo having faces. The photo is compared with a set of templates arranged in a first order to determine how compatible the photo is to each of the templates, and a score indicative of compatibility is assigned. A re-sorted set of compatible templates combined with the photo is presented to the customer for consideration.

16 Claims, 8 Drawing Sheets

(56) References Cited

U.S. PATENT DOCUMENTS

2016/0139761 A1\* 5/2016 Grosz .................. G06F 3/1243
715/769
2016/0366344 A1\* 12/2016 Pan ...................... G06F 3/0482

\* cited by examiner

COMPATIBLE

INCOMPATIBLE

US 10,694,050 B1

CUSTOM RECOMMENDATION APPLICATION FOR CREATING PHOTO BOOK COVER

PRIORITY

This application is a Continuation of U.S. patent application U.S. Ser. No. 16/268,982 filed Feb. 6, 2019 entitled Custom Recommendations Application for Creating Photo Book Cover, the teachings of which are incorporated herein in their entirety.

TECHNICAL FIELD

The disclosure relates generally to creating photo books using mobile-based software applications.

BACKGROUND

Customers sometimes become frustrated with the time and effort it takes in choosing a photo book cover that is compatible with their photo. Often times, faces in the customer's photo may be blocked by design elements of a template in a selected photo slot or otherwise cropped off the front cover. This requires the customer to choose another photo that is compatible with a chosen photo slot, or to choose other available photo slots where design elements don't block the faces of their selected photo. This sometimes leads the customer to give up in their endeavor which leads to lost revenue and an unsatisfied customer.

DETAILED DESCRIPTION

Figure 1:
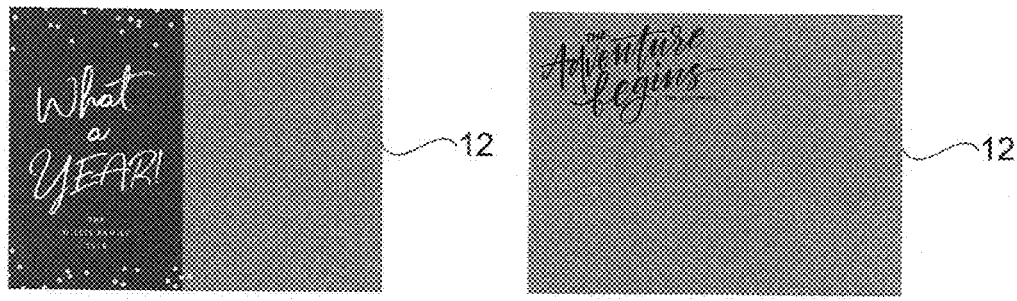
FIG. 1 illustrates an example photo provided by a customer via an application interface tested by the Front Cover Auto-Sort (FCAS) software application/algorithm for combability with two template designs.
Figure 1:
Figure 1:
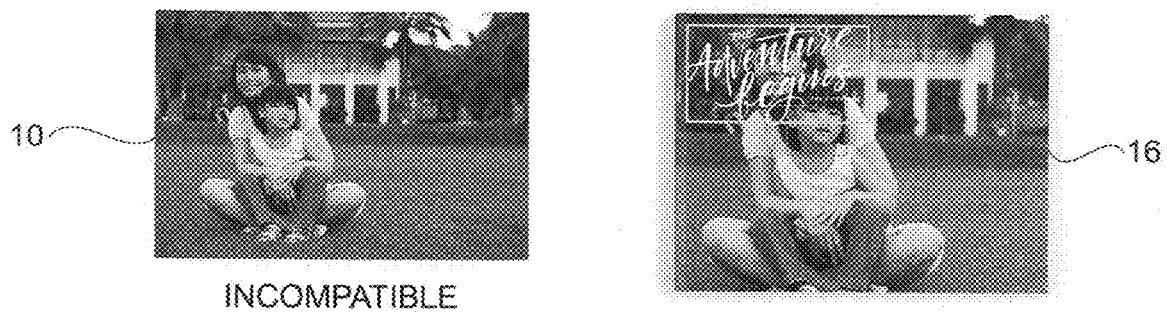

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

This description of the exemplary embodiments that follows is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both removable or rigid attachments or relationships, unless expressly described otherwise.

Additional objects, advantages and novel features of the examples will be set forth in part in the following description, and in part will become apparent to those skilled in the art upon examination of the following and the accompanying drawings or they may learn by production or operation of the examples. The methodologies, instrumentalities and combinations particularly pointed out in the appended claims assist in realizing and ascertaining the objects and advantages of the present subject matter.

FCAS Algorithm

FIG. 1 illustrates an example photo 10 provided by a customer mobile device via an application interface (FIG. 3) tested by the Front Cover Auto-Sort (FCAS) software application/algorithm for combability with two different front cover template designs 12. A photo 10 overlaid with a template 12 is defined as a photo book photo cover. The photo 10 having at least one face is compared to a set of templates 12 arranged in a prioritize first order, where each template 12 has design elements such as illustrated as script and a graphic design. For instance, the prioritized first order may be based on the popularity of the templates with users, and may have new templates or those with foil (a paid upgrade) sorted toward the top. The photo 10 is compatible with the template 12 shown as photo book front cover 14. Compatible is defined as allowing all detected faces in photo 10 to appear in a photo slot (FIGS. 6-8) without being blocked by design elements or otherwise cropped off the photo book front cover, while meeting the requirement of filling the entire photo slot. The photo 10 is not compatible with the template 12 as shown as photo book front cover 16 since the template design element does overlap the faces of the photo 10.

Figure 2:
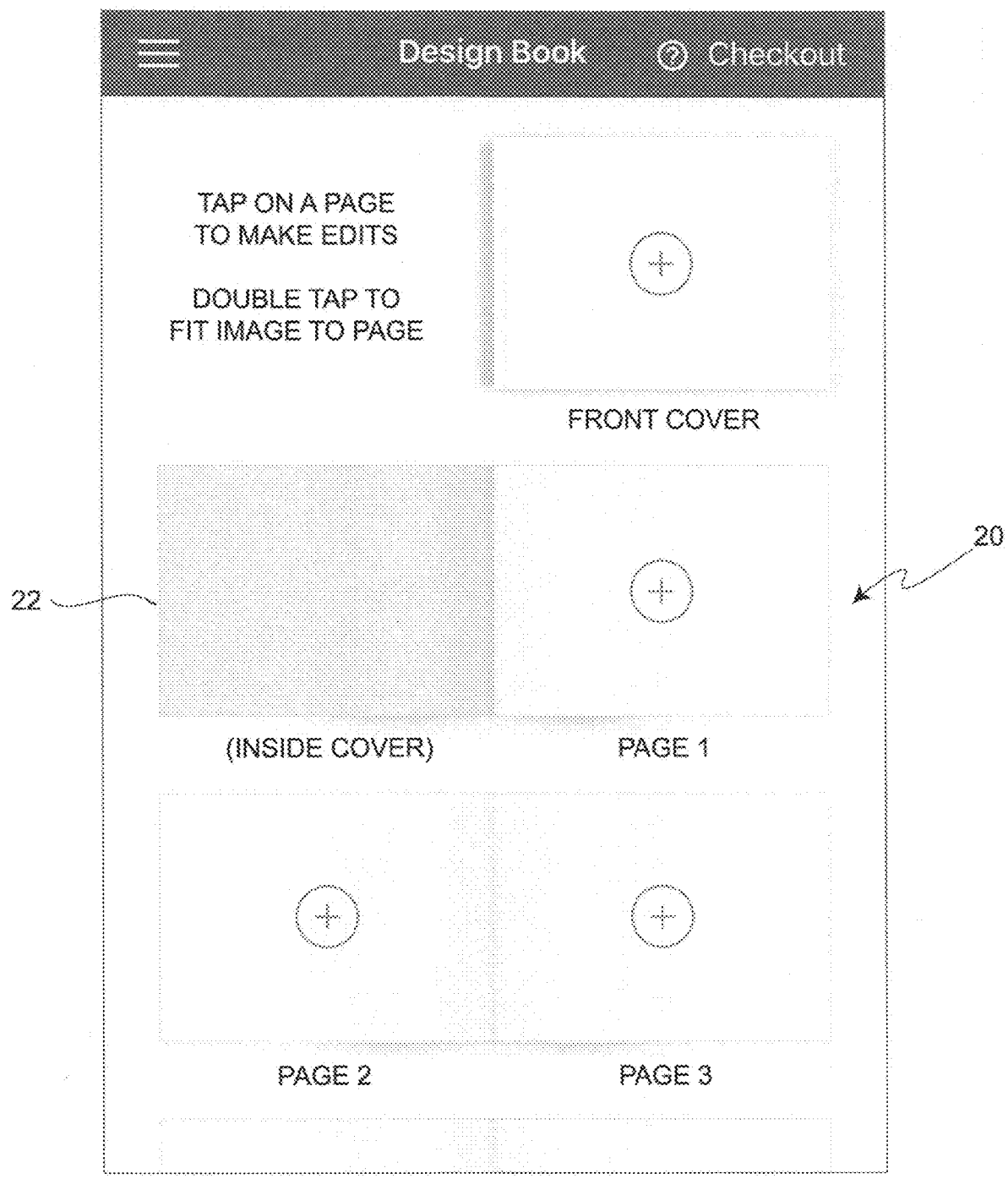
FIG. 2 illustrates a web interface configured as a graphical user interface (GUI) for launching the FCAS algorithm on a mobile device.

FIG. 2 illustrates an application program interface (API) configured as a graphical user interface (GUI) for launching the FCAS algorithm on a mobile device. The mobile device may be a mobile phone or mobile tablet, for instance, having a processor, memory, display, and processor instructions/code for operating the FCAS algorithm.

Figure 3:
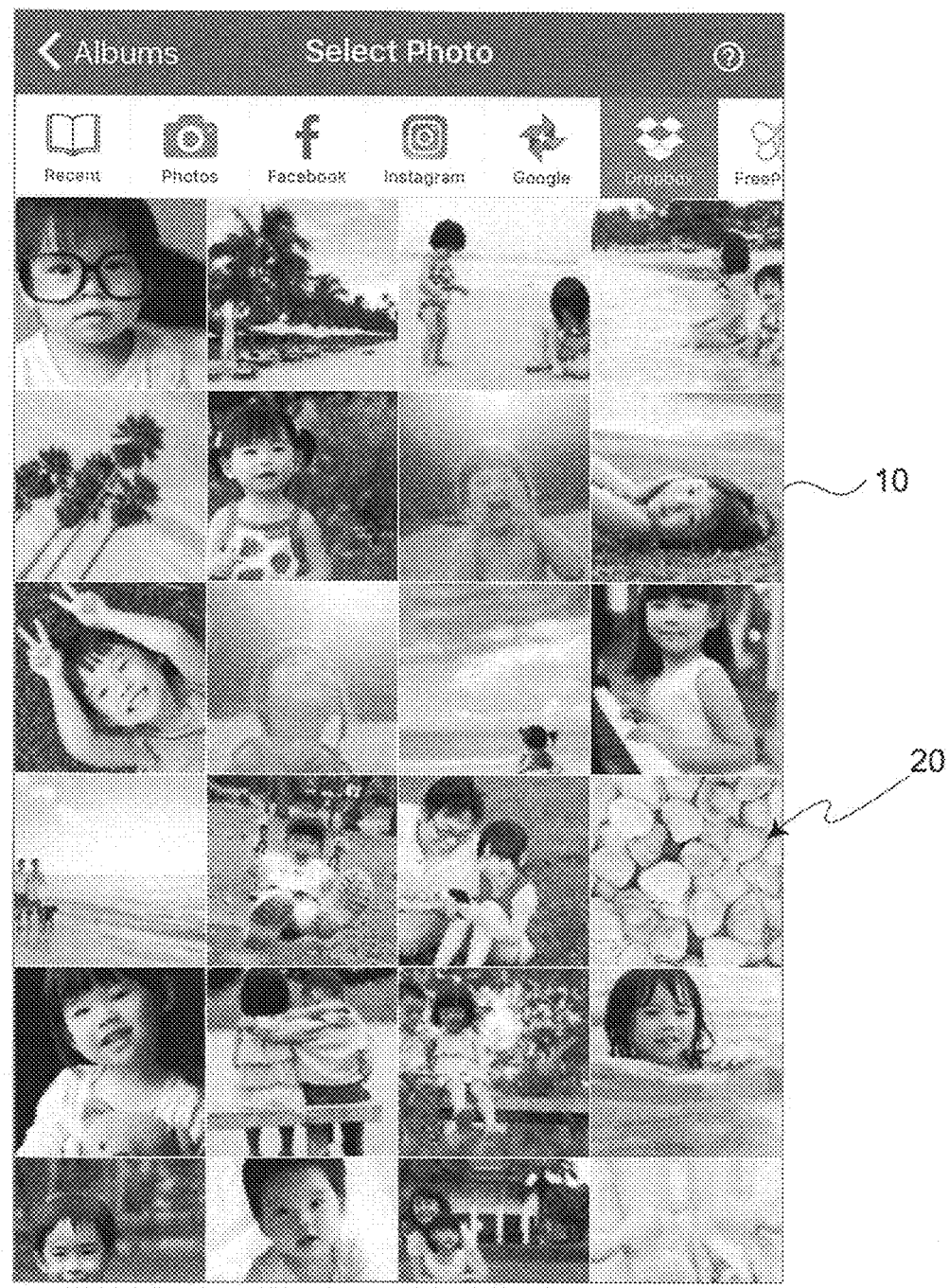
FIG. 3 illustrates a GUI of the FCAS algorithm presenting customer's photos for use by the FCAS algorithm on the mobile device.

FIG. 3 illustrates the GUI of the FCAS algorithm presenting a plurality of customer photos 10 for use by the FCAS algorithm on the mobile device.

Figure 4:
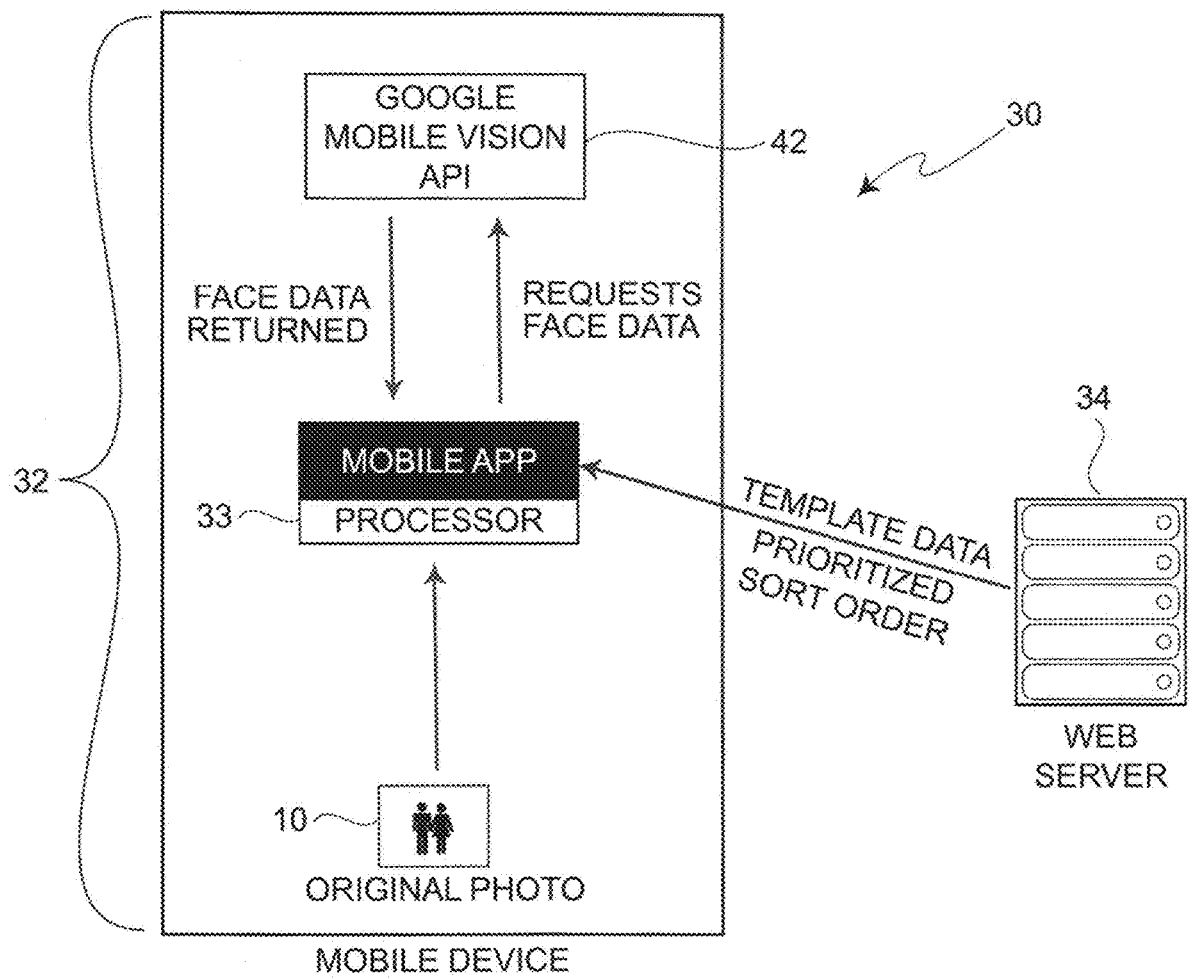
FIG. 4 illustrates as a system and method of operating the FCAS algorithm.

FIG. 4 illustrates a computing system 30 operating the FCAS algorithm to compare face data of a user selected photo 10 with template data of a set of templates 12 stored in a hosted web server 34 and arranged in the first order, and assign a health score to each photo cover. Each cover template 12 (FIG. 1) includes the coordinates of any graphic elements in the template, such as raster objects, shapes, or text, that may block any area of a photo slot. The better the fit of the photo 10 to the template 12 the lower the health score, and the more compatible the photo and template are with each other.

The computing device 32 includes an electronic processor 33 and a non-transitory computer readable medium including instructions/code for executing the FCAS algorithm. In one example, the computing device 32 may comprise a mobile device with wireless communication components and applications for sending/receiving specific types of electronic messages. The FCAS algorithm is performed locally on the device 32.

A user selects a photo 10 from a file containing multiple photos in computing device 32, such as by tapping a displayed photo as shown in FIG. 3, or by obtaining from a third party source. A Google Mobile Vision SDK API 42 is installed on the computing device 32, and is contained in the mobile app for an iOS mobile device, and is part of the operating system for an Android based mobile device. The API 42 is called by processor 33 for a particular photo 10, and position data of the faces in selected photo 10 is returned by API 42. The processor 33 then calls hosted web server 34 to acquire the prioritized set of design templates in a first order and the templates' coordinate data, including the design element coordinates and photo slot coordinates used to compare with face coordinates from photo 10.

Figure 10:
FIG. 10 illustrates a re-sorted list of front cover templates using photos with faces, post FCAS algorithm.

After the prioritized set of design templates in the first order is accessed by computing device 32, the FCAS algorithm compares face coordinate data of photo 10 with template coordinate data of all templates in the set, and sorts template designs that are not compatible, such as shown at 16 in FIG. 1, to a bottom of the set templates organized in a list (FIG. 10). The template designs are not compatible when the photo 10 cannot be positioned in a way that all faces are shown in the photo slot without obstruction from other design elements of the template while also filling the photo slot entirely. This is the case when the coordinate data of the face of the photo 10 overlaps with the coordinate data of the design element of the template 12.

As shown in FIG. 4, the FCAS algorithm and methodology includes the steps of the mobile app calling the Google Mobile Vision API 42, or a fallback system API, to detect faces in photo 10 and return coordinate position data of the detected faces. For an Android operating system (OS): Google Mobile Vision API. If no support for Google Play services: FaceDetector. For Apple iOS: Google Mobile Vision API. If iOS 10 or lower or on low RAM devices; CIDetector.

The FCAS algorithm compares the face coordinate position data to the coordinates of the design elements of a template in a photo slot to determine if the photo 10 can be shown in a given template with all detected faces clearly visible, with no blocking elements over the faces and no faces cropped out of the photo slot.

While performing the data comparison above for all templates 12 in the set, the FCAS algorithm works under the constraint that a photo 10 must fill a photo slot in its entirety. One dimension of the photo 10 will be filled in the photo slot edge to edge, with no portion of the photo outside of the photo slot in that dimension, and the other dimension of the photo will be cropped as much as needed based on the difference in aspect ratio of the photo and the photo slot. See FIGS. 5 and 6.

Figure 5:
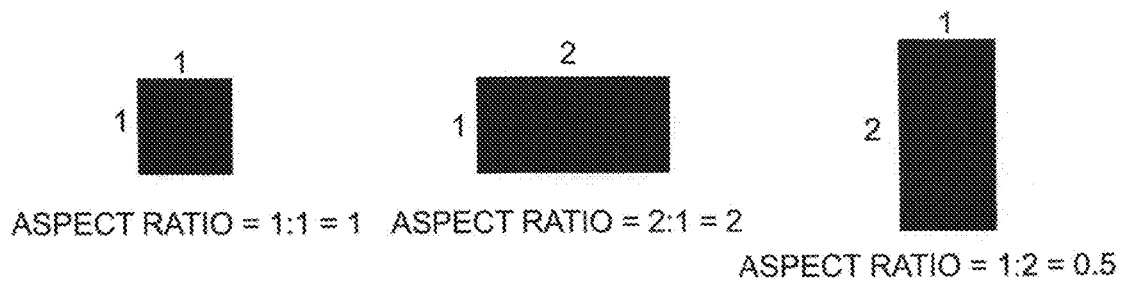
FIG. 5 illustrates Aspect Ratio (AR) as a decimal value.

FIG. 5 illustrates Aspect Ratio as a decimal value.

Figure 6:
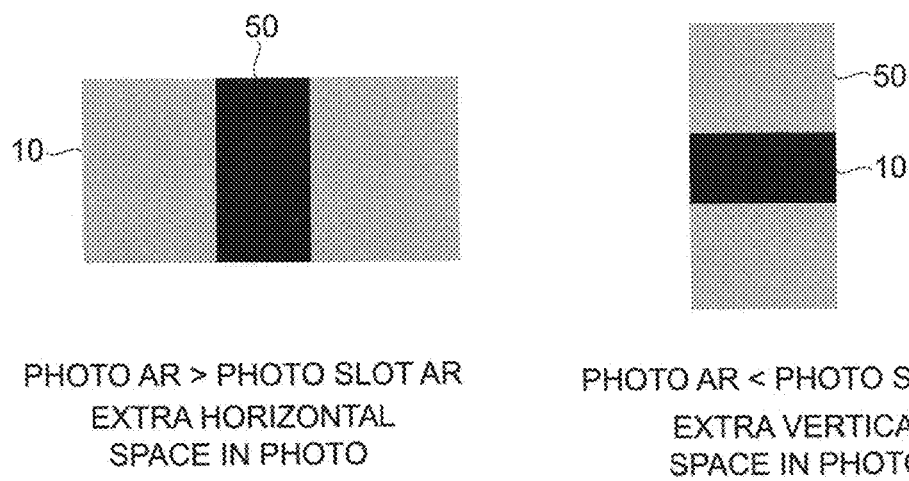
FIG. 6 illustrates two examples of photos shown to have extra space in the horizontal dimension or vertical dimensions based on the relative values of the photo slot's aspect AR and the photo's AR.

FIG. 6 illustrates two examples of photos 10 in a photo slot 50 shown to have extra space in the horizontal dimension or vertical dimensions based on the relative values of the photo slot's aspect ratio (AR) and the photo's AR. This shows that when the AR of the photo 10 is greater than the AR of the photo slot 50, there is extra space in the horizontal dimension of the photo (left illustration). When the AR of the photo 10 is less than the AR of the photo slot 50, there is extra space in the vertical dimension of the photo (right illustration).

Figure 7:
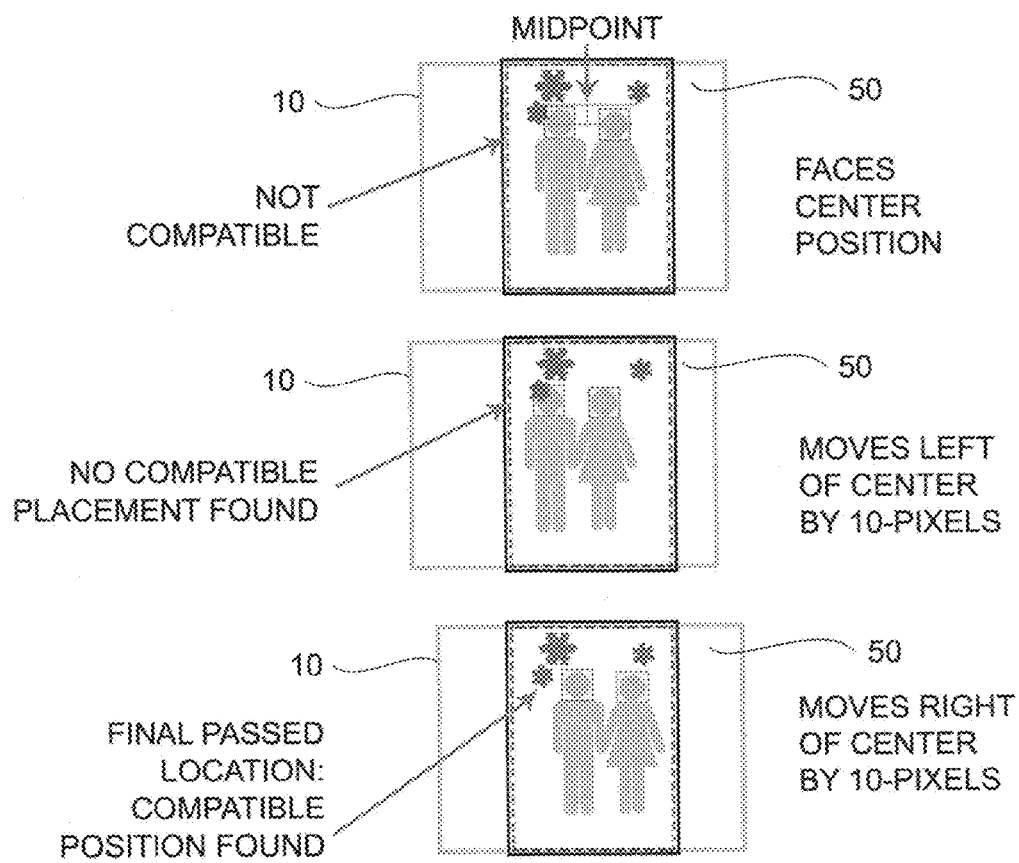
FIG. 7 illustrates the FCAS algorithm determining the optimum location for the photo in the horizontal direction based on these rules.
Figure 8:
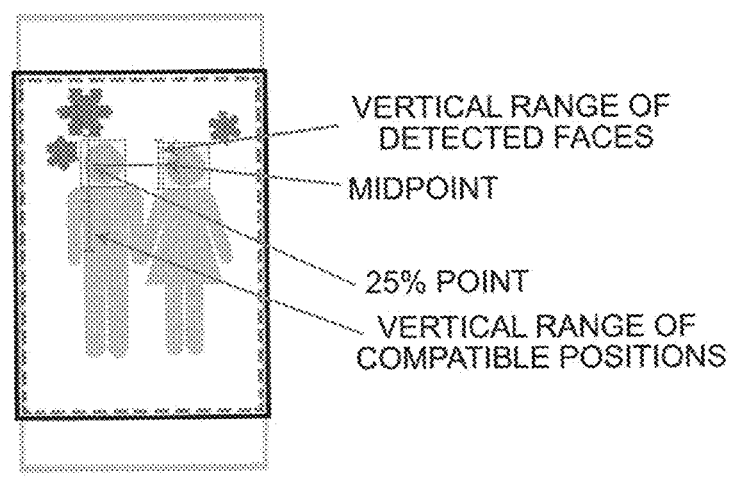
FIG. 8 illustrates the FCAS algorithm determining the optimum location for the photo in the vertical direction based on these rules.

The FCAS algorithm checks iteratively by repositioning the photo 10 in the photo slot 50 along the dimension that has extra space. As shown in FIG. 7 and FIG. 8, the FCAS algorithm determines a compatible location for the photo 10 in the photo skit 50 based on rules.

To find the compatible position, the FCAS algorithm only moves a photo 10 in one dimension in the photo slot 50, horizontally or vertically and shown in FIGS. 7 and 8, respectively, depending on the relationship of the AR of photo 10 and photo slot 50. The FCAS algorithm first checks the centered position of the face(s) of photo 10 in the photo slot 50 by comparing the face coordinate data to the coordinate data of the template design element. If it passes, the process ends. If it fails, the process begins iteratively repositioning the photo 10 in the photo slot 50 with the process ending at the point a pass occurs.

As shown in FIG. 7, when the extra space in the photo slot 50 is horizontal with respect to the photo 10, the photo 10 is moved 10 pixels to the left of center in the photo slot 50 and checked. If it fails, the photo is moved 10 pixels to the right of center in the photo slot 50 and checked again. If it fails, these steps are repeated with an increment of 10 additional pixels of movement in the photo slot 50, as shown in FIG. 7.

When the photo 10 can be repositioned along the horizontal axis in the photo slot 50, the FCAS algorithm selects the first compatible position.

When the photo 10 can be repositioned along the vertical axis in the photo slot 50, as shown in FIG. 8, the FCAS algorithm selects the photo position that is 25% of the way from the topmost and bottommost compatible positions. This is different from horizontal compatible positioning because faces in a photo look better when they are closer to the top of the photo slot.

The presorted set of front cover templates is provided according to the first order and the FCAS algorithm is performed on each template 12. The health score is assigned to each template 12 depending on the algorithm's results from comparing the photo 10 to each template 12, such as illustrated below.

a. The intersection area between any design element and face area is calculated.

Intersect Area/Face Area (Health Score: $+0.0f$–$+1.0f$)

b. The template is "Compatible" (Health Score: $+0.0f$)
  I.e., no blocking by design elements or cropping off photo book front cover.

c. The template is "Partially compatible" (Health Score: $+100.f$)
  I.e., partial/full blocking by shape masking element or cropping off photo book front cover.

d. The template is "Incompatible" (Health Score: $+200.f$)
  I.e., partial/full blocking by raster object or text slot.

A re-sorted set of front cover templates is generated in a second order using the resulting health scores of the templates. Health scores are sorted numerically, e.g. +0.0f, +100.3f, +200.7f, to create the re-sorted second order of the templates.

Figure 9:
FIG. 9 illustrates a pre-sorted set of front cover templates using photos with no faces, and no FCAS algorithm run.

FIG. 9 illustrates a pre-sorted set/list of front cover templates using photos with no faces, and no FCAS algorithm run.

FIG. 10 illustrates the re-sorted list of front cover layouts using photos with faces, post FCAS algorithm and based on the health scores of each template that are displayed to a user.

The terms and expressions used herein are understood to have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A non-transitory computer-readable medium storing program code which, when executed, is operative to cause a computing device to perform the steps of:

receiving an electronic photo having at least one face and determining a position of the face with respect to electronic photo;

comparing the electronic photo with a plurality of templates having a design element, wherein the plurality of templates are arranged in a first order;

determining if the position of the at least one face is overlapped by the design element when the electronic photo is overlaid with the plurality of templates; and presenting the electronic photo with at least several of the plurality of templates on a display in a second order that is different than the first order as a function of the whether the electronic photo can be combined with the plurality of templates without the respective template overlapping the face in the electronic photo.

2. The non-transitory computer-readable medium as specified in claim 1 further comprising code for assigning a score to each of the plurality of templates that is indicative of an alignment of the face in the electronic photo with respect to the design element of the respective template, and presenting the electronic photo with at least several of the plurality of templates on the display in the second order as a function of the score.

3. The non-transitory computer-readable medium as specified in claim 1 further including code for comparing the plurality of templates to the electronic photo, and display templates combined with the electronic photo in the second order of preference based on criteria.

4. The non-transitory computer-readable medium as specified in claim 1 further including code for presenting the plurality of the templates combined with the electronic photo on the display only if the face is not cropped out of a photo slot.

5. The non-transitory computer-readable medium as specified in claim 1 further including code to positioning the electronic photo in the template in a compatible position.

6. The non-transitory computer-readable medium as specified in claim 1 further including code for accessing template data from a web server.

7. The non-transitory computer-readable medium as specified in claim 1 further including code for accessing the plurality of templates from a data file.

8. The non-transitory computer-readable medium as specified in claim 1 wherein the computing device is a mobile device.

9. A computing device having a non-transitory computer-readable medium storing program code which, when executed, is operative to cause a processor to perform the steps of:

receiving an electronic photo having at least one face and determining a position of the face with respect to electronic photo;

comparing the electronic photo with a plurality of templates having a design element, wherein the plurality of templates are arranged in a first order;

determining if the position of the at least one face is overlapped by the design element when the electronic photo is overlaid with the plurality of templates; and presenting the electronic photo with at least several of the plurality of templates on a display in a second order that is different than the first order as a function of whether the electronic photo can be combined with the plurality of templates without the respective template overlapping the face in the electronic photo.

10. The computing device as specified in claim 9 further comprising code for assigning a score to each of the plurality of templates that is indicative of an alignment of the face in the electronic photo with respect to the design element of the respective template, and presenting the electronic photo with at least several of the plurality of templates on the display in the second order as a function of the score.

11. The computing device as specified in claim 9 further including code for comparing the plurality of templates to the electronic photo, and display templates combined with the electronic photo in a second order of preference based on criteria.

12. The computing device as specified in claim 9 further including code for presenting the plurality of templates combined with the electronic photo on the display only if the face is not cropped out of a photo slot.

13. The computing device as specified in claim 9 further including code for positioning the electronic photo in the template in a compatible position.

14. The computing device as specified in claim 9 further including code to access template data from a web server.

15. The computing device as specified in claim 9 further including code to access the plurality of templates from a data file.

16. The computing device as specified in claim 9 wherein the device is a mobile device.

\* \* \* \* \*